(12) United States Patent
Kingston et al.

(10) Patent No.: US 7,602,835 B1
(45) Date of Patent: Oct. 13, 2009

(54) MULTI-RATE SPREAD SPECTRUM COMPOSITE CODE

(75) Inventors: Samuel C. Kingston, Salt Lake City, UT (US); Johnny M. Harris, Centerville, UT (US); Thomas R. Giallorenzi, Riverton, UT (US); Dan M. Griffin, Bountiful, UT (US); David W. Thorson, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 595 days.

(21) Appl. No.: 10/915,777

(22) Filed: Aug. 10, 2004

(51) Int. Cl.
*H04B 1/00* (2006.01)

(52) U.S. Cl. .............. 375/142; 375/134; 375/135; 375/136; 375/137; 375/140; 375/143; 375/145; 375/146; 375/147; 375/149; 375/150; 375/152; 375/253; 375/306; 375/307; 375/316; 375/326; 375/350; 375/367

(58) Field of Classification Search ......... 375/134–137, 375/140, 142–143, 145–147, 149–150, 152–153, 375/253, 306–307, 316, 326, 350, 255, 367, 375/105–109
See application file for complete search history.

(56) References Cited

U.S. PATENT DOCUMENTS

| | | | | |
|---|---|---|---|---|
| 4,633,426 A | * | 12/1986 | Venier | 708/314 |
| 6,049,576 A | * | 4/2000 | Magill | 375/365 |
| 6,128,332 A | * | 10/2000 | Fukawa et al. | 375/146 |
| 6,831,929 B1 | * | 12/2004 | Sriram et al. | 370/515 |
| 2003/0012270 A1 | * | 1/2003 | Zhou et al. | 375/150 |
| 2003/0206577 A1 | * | 11/2003 | Liberti et al. | 375/152 |
| 2005/0238087 A1 | * | 10/2005 | Yang et al. | 375/219 |

OTHER PUBLICATIONS

Yao et al., "A Two-Layer Spreading Code Scheme for Dual-Rate DS-CDMA Systems", Jun. 2003, IEEE Transactions on Communications, Vo.. 51, No. 6, pp. 873-879.

* cited by examiner

*Primary Examiner*—Shuwang Liu
*Assistant Examiner*—Kabir A Timory
(74) *Attorney, Agent, or Firm*—Harrington & Smith, PC (57) ABSTRACT

A correlator despreads a P/N long code constructed from two or more constituent codes A, B, C having N, M and L elements respectively. In a third stage, L filter taps decorrelate elements of the third constituent code from the input received signal, leaving elements of code AB. The outputs of the third stage delay line are summed and input into a second stage delay line having M filter taps to decorrelate the elements of the second constituent code from the input to the second stage, leaving elements of code A. The outputs of the second stage delay line are summed and input to a first stage delay line having N filter taps. The output of the first stage delay line is summed and input into a shift register. An energy peak in the shift register indicates the phase of the P/N elements in the register is proper.

16 Claims, 5 Drawing Sheets

MULTI-RATE SPREAD SPECTRUM COMPOSITE CODE

FIELD OF THE INVENTION

The present invention relates to spread spectrum communication systems, particularly, a long code sequence and a method for building and deriving such a code that is less computationally expensive than known CDMA long codes.

BACKGROUND

In digital spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate to data rate. In many applications, there are thousands of code chips per data bit.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time aligned with the received P/N code. This is the de-spreading process.

Generating the carrier replica with proper carrier frequency and phase and generating the P/N code replica at the proper rate and time offset is a complex problem. In many DSS communication systems, the necessary carrier frequency, carrier phase, and P/N code offset are not known a priori at the receiver, which tries different values until a large signal is observed at the data-filter output. This is termed the search or acquisition process, and a DSS signal is said to be acquired when the proper frequency, phase, and code offset have been determined. A receiver selects and detects a particular transmitted signal by choosing the appropriate P/N code and performing the acquisition search. In some cases the acquisition search must include examination of different P/N codes from a known list when the transmitting node is not known, as is the likely scenario in FIG. 1. When many different codes, code offsets and carrier frequencies must be examined and the SNR is low, the acquisition task can be both time and energy consuming.

The above constraints are more pronounced in a secure environment such as that depicted in FIG. 1 (detailed below), where a new node termed a hailing node 34 seeks to join an existing network while maintaining security for the joining node and those nodes already on the network. In addition, an established network requires a method of discovering the existence of another separate network that may have migrated into communication range, so that a cross-link can be established between the networks in order to form a larger network. This process of nodes "discovering" each other is termed herein node discovery, and is where DSS signal acquisition occurs. Typically, node discovery is done on channels separate from the primary data communication channels. Limited data exchange on the 'discovery channel' is preferable for network optimization. As a result, the discovery waveform must be flexible in the messages it carries and not be constrained to one specific message type or size.

The air interface should consist of a flexible and symmetric full-duplex or half-duplex link. The transmitting node or hailing node is that node that sends a discovery burst, essentially a message inquiring as to the presence of receiving nodes. Receiving nodes are the nodes that listen for that discovery burst. The receiving nodes are therefore target nodes, which may already have formed a network. These receiving nodes may become transmitting nodes when they send an acknowledgement back to the initiating new node. In this way, a new node that flies into range of an established network will transmit burst discovery messages on that transmitting node's transmit link. When a receiving node in the established network hears the discovery message on its receive link, it will respond via its transmit link which is the hailing node's receiving link. Subsequent handshaking can then be performed via the two node's transmit and receive links to bring the initiating new node into the network. The transmitting and receiving links may occupy separate time slots in a time division duplex (TDD) system, or may be separate frequency bands in a frequency division duplex (FDD) system.

Figure 1:
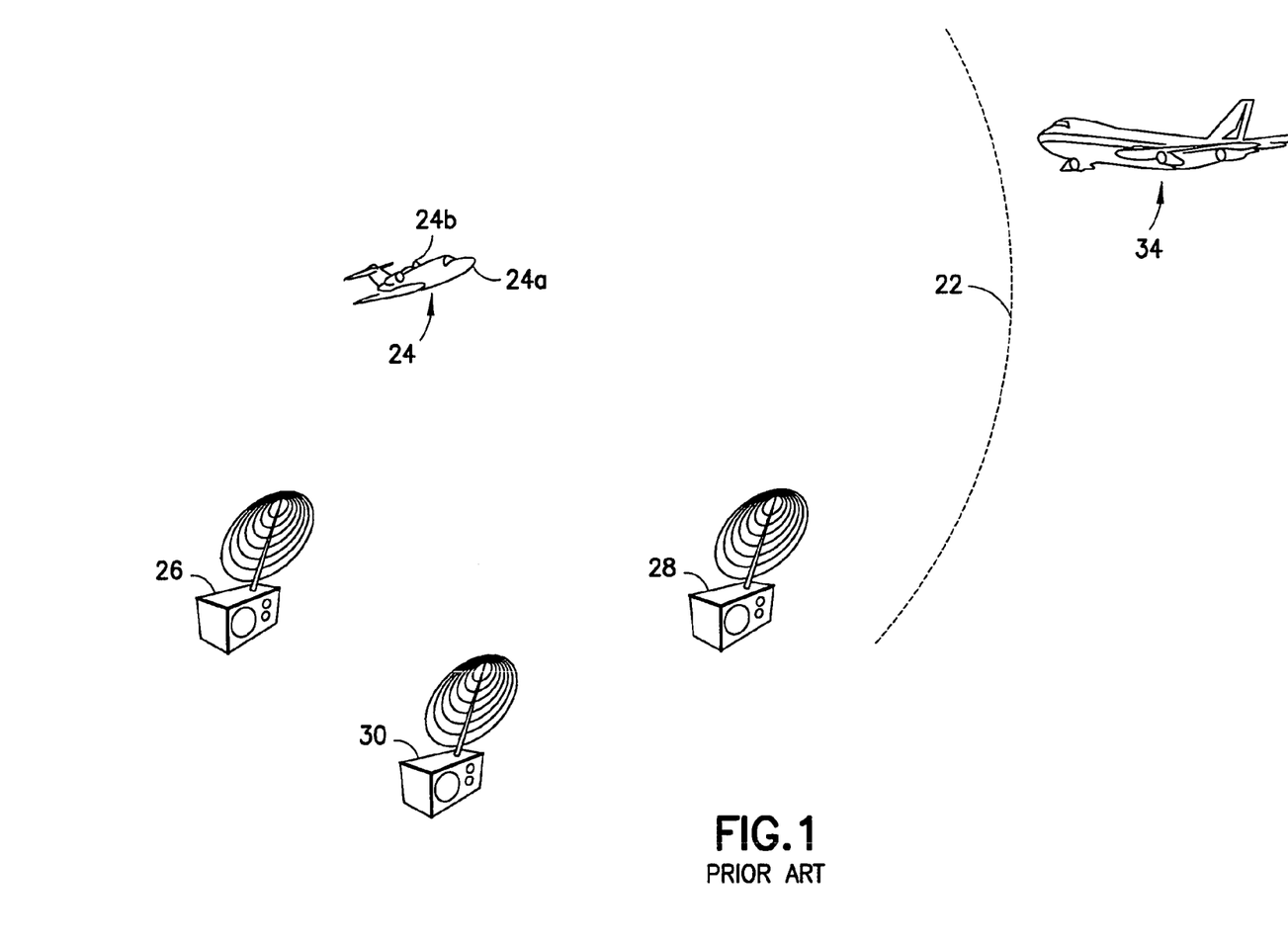
FIG. 1 is a schematic diagram of a particularly challenging prior art communication system in which a hailing node seeks entry into a communication network, and is an apt environment for the present invention.

An exemplary but non-limiting environment in which node discovery may be important is illustrated in perspective view at FIG. 1, a prior art arrangement of disparate nodes operating in a traffic data network and one hailing node seeking to join the traffic network. The nodes may be airborne as in aircraft; terrestrial as in autos, trucks, and trains; or waterborne as in ships and other surface watercraft. They may be stationary or mobile, fast or slow moving, as for example, communications between nodes in a building, an aircraft, and an auto. For additional flexibility, it is assumed that a hailing node 34 may not have a clock signal synchronized with the network prior to joining. The range 22 of the traffic data network is centered on a command node 24, absent relays by other nodes within the network. Where the network links members via a satellite link, the line-of-sight range 22 is not particularly relevant. The range 22 is included to show further advantages of the invention that may be exploited when network communications are geographically limited.

The command node controls access to the network, identifying nodes and answering discovery bursts with a particularly long P/N code for data exchange to ensure networked members may communicate securely. In FIG. 1, all nodes depicted as within the traffic network range 22 communicate on the traffic network, either through the command node 24 or directly with one another once granted network entry. The traffic network typically operates by directional antennas 24a, at least at the command node 24, to maximize the network range 22. This is because directional antennas typically enable a higher antenna gain and a higher tolerable path loss as compared to omni-directional antennas. Therefore, a range (not shown) of a discovery network that operates using omni-directional antennas 24b is somewhat less, at least in the prior art. The command node 24 maintains communication with stationary nodes 26, 28. When two nodes are aircraft, they may be closing or separating from one another at very high rates, rendering Doppler effects significant. When a hailing node 34 sends a discovery burst to locate and request entry into the traffic network, its signal is typically not received at the command node 24 until the hailing node is within the traffic network range 22. Since the hailing node 34 is not yet identified as authorized, this potentially puts communications within the network at risk, or alternatively unduly delays granting the hailing node 34 access to the network. Because access to the traffic network is obtained through the discovery protocol, that protocol must exhibit security features to prevent compromise of the traffic network.

Considering the issues apparent in light of FIG. 1, a good node discovery scheme for a highly secure communications network would therefore exhibit (a) high speed and reliability; (b) long range; (c) low probability of intercept (LPI) and low probability of detection (LPD) by unauthorized parties; (d) universal discovery and recognition among the various nodes; (e) asynchronous discovery; and (f) reliability for both stationary and fast-moving nodes. As to item (a), discovery and verification of a hailing node is a key metric used to evaluate various discovery schemes. Fast network entry is desirable because it permits nodes to enter and exit networks frequently and further minimizes the time spent sending discovery bursts, reducing LPD.

As to item (b), discovery and verification should preferably be done when the hailing node is beyond the range of direct communications with the network. In secure communications without satellite links where range is limited, hailing nodes are unaware of the location of nodes within the network and vice versa, so omni-directional antennas are generally used for discovery. This is because the reduced range of communications using omni-directional antennas is more than offset by having to scan various quadrants with a directional antenna for entering nodes that may come from any direction. Once within a network, nodes use directional antennas for increased range and reduced LPI. If all discovery handshaking can occur before the hailing node is in directional antenna range, then all synchronization can be done ahead of time. This synchronization will include the synchronization of chip clocks and carrier local oscillators in the presence of potentially large Doppler and reference clock offsets, antenna pointing, and the acquisition of very long PN codes.

To facilitate LPI/LPD of item (c), the waveform must support very fast acquisition; the receiving node must be capable of reliably extracting data from the transmitting node within a small fraction of a second from when the transmission begins, so that bursts are short and covert. The initial bursts should be at the lowest possible power level and spread over a band that is wider than the signal bandwidth required. This fast acquisition should occur regardless of whether a node is stationary or mobile at rates of up to several thousand km/hr in any direction, and when relative velocity between nodes is neither known nor estimable before discovery.

Item (d) is that any node is capable of discovering any other node. This implies, for example, that if an FDD approach is adopted, wherein nodes that transmit in frequency band A and receive in frequency band B, can only be heard by nodes that receive in band A, then the nodes must be capable of switching their FDD polarity. In other words, if a hailing node sends discovery bursts in band A and receives no response, then it must be capable of switching to band B to search for nodes listening in that band. Correspondingly, a TDD system imposes the trivial constraint that nodes be capable of switching which time slot in which they transmit Item (e) is desirable for discovery to avoid a need for a complicated and cumbersome clock availability requirement across the system. This complicates discovery in that discovery bursts may be sent at any time rather than in designated slots (thus enhancing LPD, LPI, and discovery range for mobile nodes closing on one another), and eliminates the need for hailing nodes to be synchronized with precision.

What is needed in the art is a receiver that can quickly acquire a node discovery signal or a reply to one (e.g., determine the PN code, phase, offset, and frequency). One particularly flexible code is described in a paper by Yingwei Yao and H. Vincent Poor, entitled *A Two-Layer Spreading Code Scheme for Dual Rate CDMA Systems*, IEEE TRANSACTIONS ON COMMUNICATIONS, vol. 51, No. 6, p. 873-879; Jun. 6, 2003. That paper describes a dual-rate direct sequence CDMA system using a variable spreading length two-layer P/N code. The authors claim advantageous results with simulations using recursive least squares receivers. The concept of codes with more than two layers is also disclosed. While the inventors herein have independently arrived at multi-layer codes similar to those of Yao and Poor, they have also developed a receiver that enables the advantages noted above that is novel over the recursive least squares receiver described by the above authors.

SUMMARY OF THE INVENTION

In accordance with one aspect, the present invention is a correlator to despread a composite long code defining a length of at least $N*M$, where N and M are integers each greater than one. The correlator may be considered as having a first and second stage. The first stage includes a first plurality of at least $N-1$ delay elements arranged in series with one another, a first plurality of at least N filter taps, and a first despread adder. Each of the first stage filter taps has an input that is coupled to either an input or an output of one of the N first stage delay elements. The first despread adder has an input coupled to an output of each of the at least N filter taps.

The second stage includes a second plurality of at least $M-1$ delay elements arranged in series with one another, a second plurality of at least M filter taps, and a second despread adder. Each of the second stage filter taps has an input that is coupled to either an input or an output of one of the $M-1$ second stage delay elements. The second despread adder has an input that is coupled to an output of each of the at least M filter taps. The first and second stages are related in that an output of the second despread adder is coupled to an input of the series that is the first plurality of at least N delay elements.

As will be described, preferably the delay elements impose a common time delay within a stage but different time delays between circuit stages so they run at different rates, while each delay element within a stage imposes a common time delay. Where the composite code is constructed from different constituent sub-codes, each stage decorrelates one of the constituent sub-codes. Additional stages may be imposed similar to the second stage, and arranged so that, for example, a third despread adder has an output that is coupled to an input of the second plurality of delay elements. This extension may be continued to fourth, fifth, etc. circuit stages.

The present invention is in another aspect a method of decorrelating a P/N code, where the code does not repeat for at least $N*M$ elements, N and M again being integers greater than one. In accordance with the method, each of a set of M first constituent code elements are filtered at a first rate from a received input signal. Each of a set of N second constituent code elements are filtered at a second rate from a summation of the filtered set of first constituent code elements. Each of the second set of N constituent code elements are summed, and the summed set of N second constituent code elements is input into a register and stored. The above filtering at a first and second rate, summing, inputting and storing are repeating in sequence for $N*M$ time intervals until $N*M$ separate summed sets of the N second constituent code elements are stored. The P/N code is decorrelated when the $N*M$ separate summed sets exhibit an energy peak. As with the correlator apparatus, the inventive method may be extended for more than two layers similar to the correlator being extended to more than two circuit stages.

In yet another aspect, the present invention is a mobile platform for transmitting and receiving a discovery burst. The mobile platform includes at least one antenna that may be an omni-directional antenna used for the discovery burst. It also includes a transmitter for transmitting a discovery burst, where the discovery burst has a preamble and a payload. The preamble is spread using a composite P/N code, which has a plurality of serially arranged code segments. Each code segment includes an $n^{th}$ element of a first constituent code operated using an exclusive OR operator with each of M elements of a second constituent code. That the code segments are serially arranged does not necessitate that they follow one another with no intervening elements.

The mobile platform further includes a receiver for receiving the discovery burst, when the discovery burst is transmitted by another platform. The receiver has a correlator which itself includes a first and second circuit stage. The first circuit stage has at least N−1 serially disposed delay elements, at least N filter taps, and a first despread adder. Each of the N filter taps has an input that is coupled to one of an input and an output of one of the N−1 delay elements. The first despread adder sums the output of the N filter taps. The second circuit stage includes at least M−1 serially disposed delay elements, at least M filter taps, and a second despread adder. Each of the M filter taps has an input that is coupled to one of an input and an output of one of the M−1 delay elements. The second despread adder sums the output of the M filter taps, and further has an output that is coupled to an input of the serially arranged N delay elements. Each of N and M are integers at least equal to two.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

DETAILED DESCRIPTION

Consider again FIG. 1. A hailing node 34 seeking entry into the network is unaware of the location of the command 24 or other nodes already communicating on the network. Communication on the traffic channels may be done with a very long P/N code for high security, but discovery of new nodes such as the hailing node 34 generally operate apart from traffic P/N codes to secure that longer traffic code. The present invention is particularly advantageous in use with a discovery protocol for a hailing node 34 to join the network of FIG. 1, though the present invention may be used to generate composite codes of any length.

Where a discovery burst announcing the presence of the hailing node to a network (whose existence and location may be unknown to the hailing node at the time it transmits the discovery burst), it is anticipated that the composite codes described herein will be used at least in a preamble of that discovery burst. Preferably, a subsequent payload of the discovery burst will be spread using a much longer P/N code than the preamble. In this instance, the preamble may be used to resolve phase and/or timing for the payload P/N code, as well as the timing point in any encryption sequence. In such a scenario, it is incumbent that the phase be resolved very quickly, on the order of about 600 msec for a preamble of 500 symbols within a discovery burst of about 1200 symbols and a chip rate of about 10 Mcps. Prior art parallel correlators are not seen as capable of achieving this metric within the size constraints deemed necessary for implementation in the smaller nodes of FIG. 1.

The present invention uses a plurality of constituent codes or sub-codes to construct a composite long code such as the pseudorandom number (PN) codes used in a CDMA communication system. Even if there were no Doppler shifts of the carrier and chip frequencies and perfect clocks were used between hailing 34 and command 24 nodes of FIG. 1, the problem of finding PN chip phase alignment is not insubstantial.

The multi-rate composite codes according to the present invention may be constructed from two to any number of constituent codes. For purposes of this description and the claims, a constituent code is represented by a capital letter A, B, C, etc., and elements of the codes are represented by lower case letters with subscripts, such as elements $a_1, a_2, a_3, \ldots a_N$ for code A that has a total of N elements. A lower case letter in the subscript indicates a variable number, such as $a_n$ represents an $n^{th}$ element of the code A where n varies from 1 to N. An upper case letter in the subscript indicates the final element of the code, such as $a_N$ represents the $N^{th}$ element of the code A that has N elements.

By way of example, consider two constituent codes A and B, wherein A is a first constituent code having N=ten elements and B is a second constituent code having M=ten elements. The composite code of the present invention need not be constructed from equal length constituent codes. The elements of the constituent codes may be any real or complex valued quantity, though in practice the elements are typically either +1 or −1. The resulting composite code will include at least 100 elements, and will exhibit ten code segments each bearing ten composite elements. Additional elements may be disposed between the code segments. The first code segment is obtained by operating the first element $b_1$ of the second constituent code B with each element $a_1, a_2, \ldots a_N$ of the first constituent code A using an exclusive OR operation. Label this code segment as $Ab_1$. The second code segment is obtained by similarly operating the second element $b_2$ of the second constituent code B with each element $a_1, a_2, \ldots a_N$ of the first constituent code A to yield $Ab_2$. This continues for each of the M elements of the second constituent code, yielding ten code segments each of length ten elements. The resulting composite code is then written as AB. The code segments $Ab_m$ are arranged serially, and may have additional code elements disposed between the segments as is described in U.S. patent application Ser. No. 10/915,776 filed Aug. 10, 2004. The various codes and nomenclatures are depicted below.

| | |
|---|---|
| $1^{st}$ constituent code A: | $A = a_1, a_2, a_3, \ldots a_N$; |
| $2^{nd}$ constituent code B: | $B = b_1, b_2, b_3, \ldots b_M$; |
| $1^{st}$ code segment: | $Ab_1 = a_1 \oplus b_1, a_2 \oplus b_1, a_3 \oplus b_1, \ldots a_N \oplus b_1$; |
| $2^{nd}$ code segment: | $Ab_2 = a_1 \oplus b_2, a_2 \oplus b_2, a_3 \oplus b_2, \ldots a_N \oplus b_2$; |
| composite code: | $AB = Ab_1, Ab_2, Ab_3, \ldots Ab_M$ |

It is clear from the above that each code segment has the same length N, and the composite code has M code segments arranged seriatim for a total of N*M elements in the composite code (barring the addition of further elements between code segments). Because the above example constructs the composite code from two constituent codes, it will be termed a two-layer composite code. It is noted that the above code segments are constructed by operating code elements by an exclusive- or operation. That is valid for real-valued code elements, but a multiplication of elements may be required for imaginary code elements. For simplicity, this description generally presumes real code elements combined with an exclusive- or operation. Extension of these teachings to imaginary code elements follows logically from the above distinction.

Composite codes may be in two, three, four or more layers, constructed from two, three, four, and any number of constituent codes, respectively. For example, consider a third constituent code C having L elements $c_1, c_2, c_3, \ldots c_L$ combined with the constituent codes A and B above. The first code segment of the composite code would be each element of AB operated with an exclusive OR with the first element $c_1$ and would be abbreviated $ABc_1$, the second code segment would be each element of AB similarly operated with the second element $c_2$ abbreviated $ABc_2$, and so forth to yield L code segments each of length N*M, and the resultant three-layer composite code ABC would exhibit a length N*M*L, barring added code elements between the segments as noted above.

It is unnecessary that the constituent codes be orthogonal to one another. So long as the constituent codes A, B, C, etc. are non-repetitive in their lengths, the code segments will be non-repetitive in their lengths. This aspect of the composite codes is explored further in co-owned U.S. patent application Ser. No. 10/915,776.

Longer code sequences in a direct sequence CDMA system are advantageous in that they enable more users in a system. Longer codes additionally also offer lower probability of detection and intercept in the potentially hostile environment of FIG. 1. However, there are disadvantages in the prior art as longer PN code sequences have required additional hardware, computational burden and/or time, and more power in the receiver during the detection/autocorrelation process. Longer codes additionally offer lower probability of detection and intercept in the environment of FIG. 1, and enable a greater processing gain. For example, a 10,000 length code allows a processing gain of about 40 dB, and a 100,000 length code allows a processing gain of about 50 dB, each of which is well beyond any prior art implementation known to the inventors.

Figure 2:
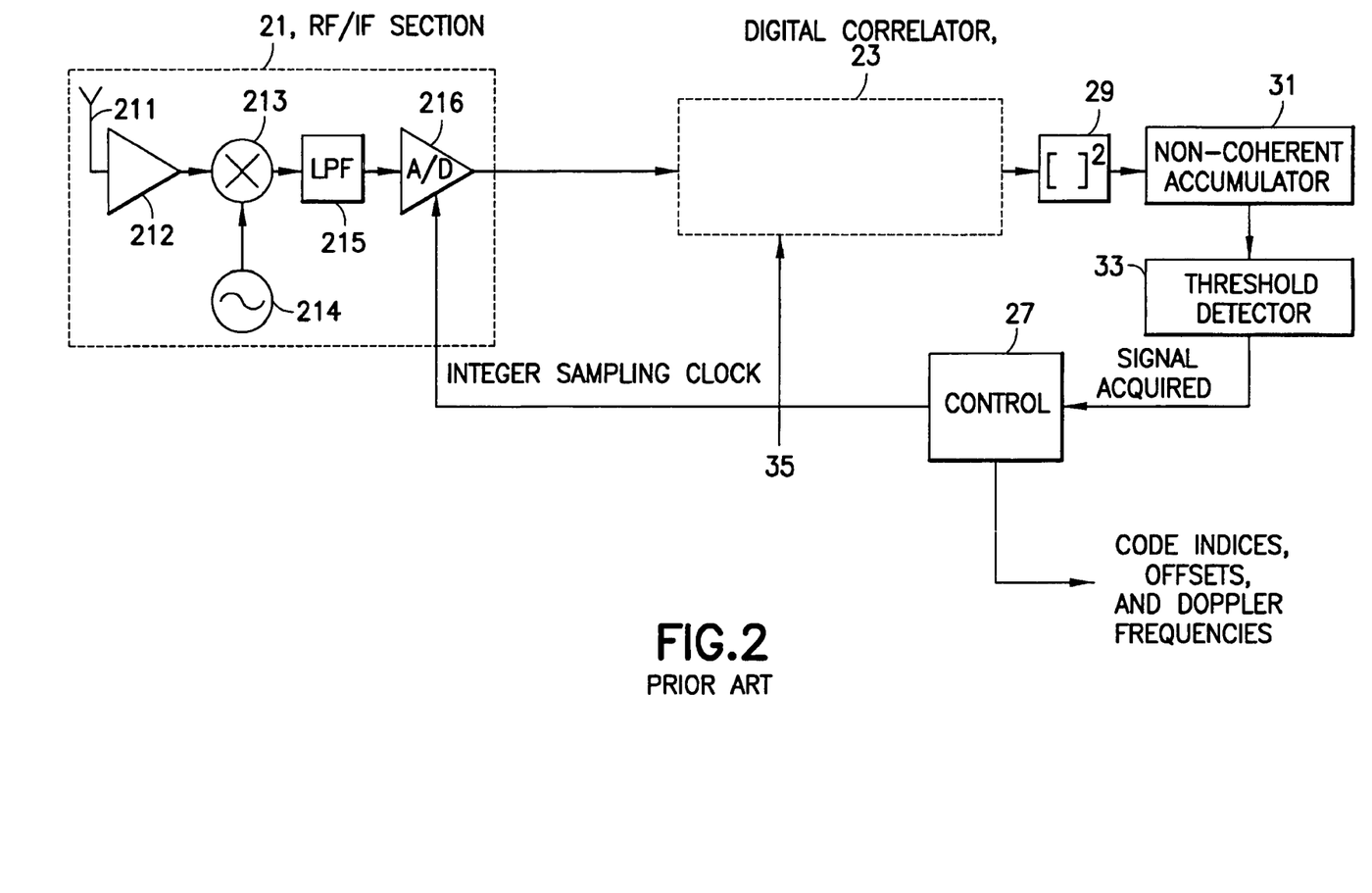
FIG. 2 is a block diagram of a prior art receiver in which the present inventive correlator may be disposed.

FIG. 2 shows a conventional serial acquisition architecture that uses a serial correlator. The signal acquisition architecture comprises an RF/IF (radio frequency/intermediate frequency) tuner section 21 including an antenna 211, an RF amplifier 212, a mixer 213 and local oscillator 214, and a low pass filter 215 which supplies a received and down-converted signal to an analog-to-digital (A/D) converter 216. The A/D converter 216 typically samples and converts at an integer multiple of the replica C/A code chip rate and supplies a digital sequence to a prior art serial digital correlator 23 having a series of multipliers and a coherent accumulator. The prior art correlator is described with reference to FIG. 3 below, but its output is squared by a squarer 29 and summed in a non-coherent accumulator 31, yielding a non-coherent integration of the coherent processing results. When a signal is acquired, a control 27 monitors the associated phase, code offset, and frequency, and the search is either continued with a new P/N code from a list or stopped if the signal has been acquired with sufficient confidence as determined by a threshold detector 33.

Additional inputs 35 to the correlator 23 may include tap weights, code offsets, frequencies and local-oscillator frequency error assumed by control 27. To insure detection of the signal, the RF/IF section 21 must generate both an in-phase (I) and a quadrature (Q) output signal (not shown in FIG. 2), and the two signals must be processed for signal acquisition. The conventional approach shown in FIG. 2 requires the receiver output data from RF/IF section 21 to be processed as soon as it is available, and processing is constrained by the code rate in the received signal.

Figure 3:
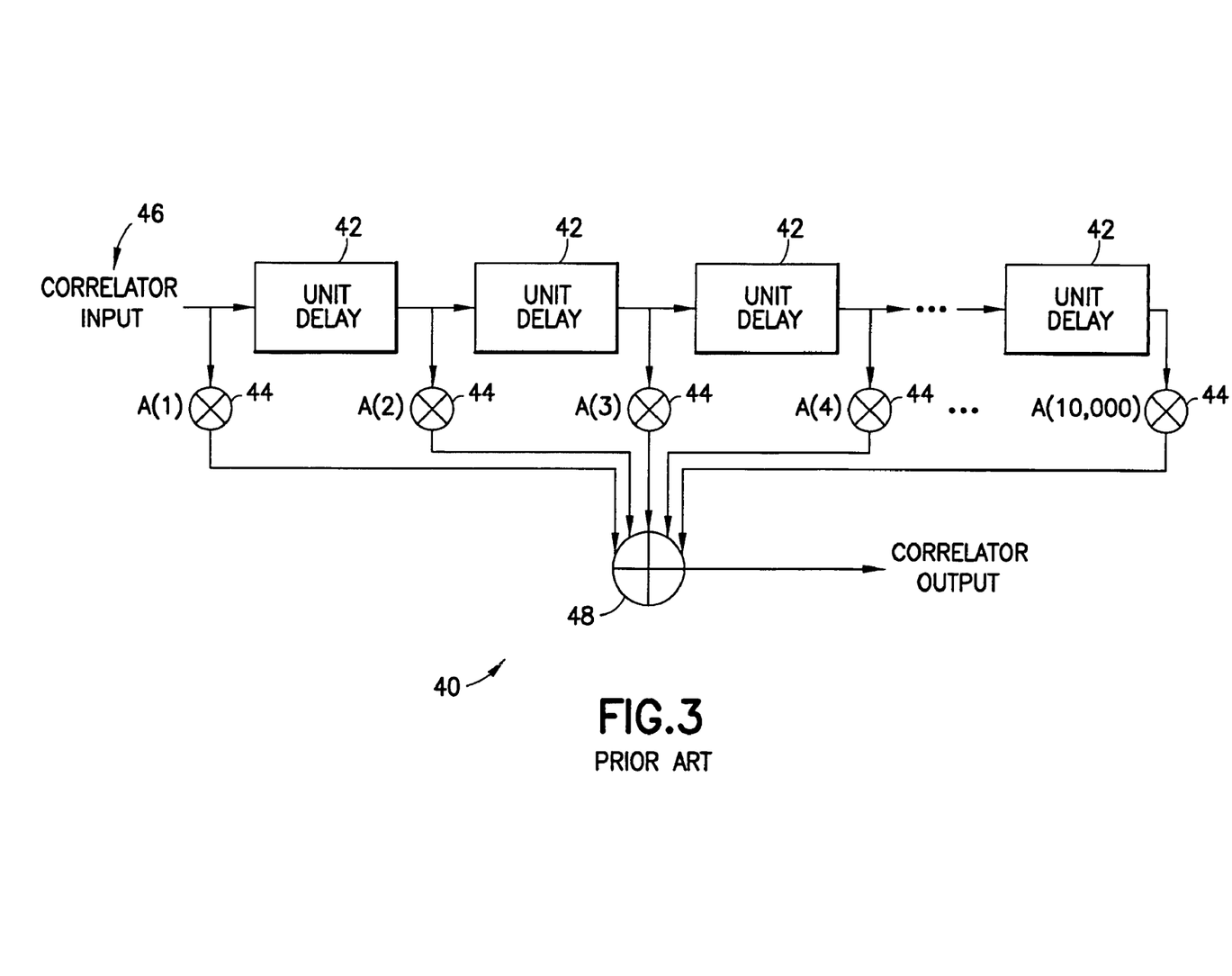
FIG. 3 is a block diagram of a prior art parallel correlator for use in a receiver operating in a spread spectrum communication system.

A typical prior art correlator 40 is depicted in block diagram at FIG. 3 for detecting a PN code A of length 10,000 elements or chips. The correlator 40 includes 10,000 unit delay elements 42 arranged in series with one another, and 10,000 FIR filter taps each having an input that is also an input to one of the delay elements 42. 10,000 filter taps 44 are necessary to process the input signal 46 in one unit of time, the time between input bits. Each filter tap 44 taps one element $a_n$ from the correlator input 46 that comes from the RF/IF section 21, and outputs of each filter tap 44 are input to a despread adder 48, which sums the inputs and outputs the result to a shift register 49 of length 10,000. At each unit of time or chip, the correlator output is input into the shift register and previous inputs to that register are shifted one memory location to the right until dropped. Thus, for a 10,000 length PN code, the prior art parallel correlator requires 10,000 filter taps/multipliers, 10,000 memory locations for the tap weights, and a 10,000 length shift register. Each time the code slips (each chip movement) requires a computational burden of 10,000 multiplies and 10,000 adds.

Figure 4:
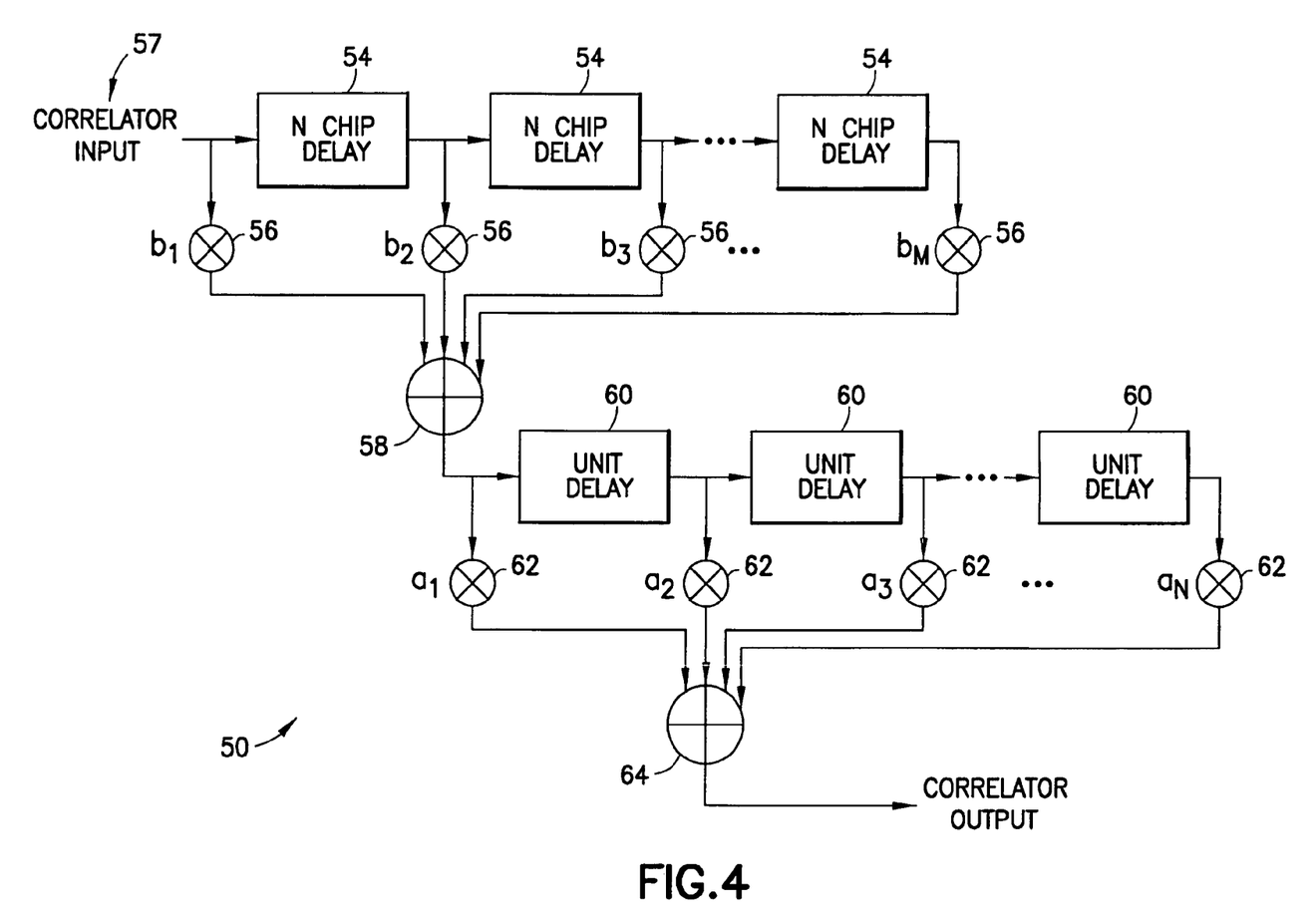
FIG. 4 is a block diagram of a simple embodiment of a correlator according to the present invention for operating on a two-level composite code.

One advantage to the composite codes described herein is that the inventive correlator described herein is greatly simplified in hardware and computational burden. FIG. 4 is a block diagram of one embodiment of a matched filter correlator 50 according to the present invention. The correlator 50 operates on a composite code of length 10,000 chips at the chip rate. Assume for FIG. 4 that the 10,000 length composite code AB is constructed from constituent codes A of length N=100 and B of length M=100. The correlator 50 has a first plurality of M−1=99 delay elements 54, but each delay elements is N=100 time units (or typically each is 100 unit delay elements). Coupled to an input or an output of the delay elements 54 are a plurality of M FIR filter taps 56 that tap chips $b_1, b_2, \ldots b_M$ from the correlator input 57 and input them to a first despread adder 58. The output of the first despread adder 58 serves as an input to a second plurality of N−1=99 delay elements 60, and these delay elements 60 are in one unit time delays, the unit time being the chip rate. Coupled to an input or an output of the delay elements 60 are a plurality of N FIR filter taps 62 that tap individual chips $a_1, a_2, \ldots a_N$ from the delay line output from the first despread adder 58, which are input to a second despread adder 64 and summed. A shift register 65 receives the output chips from the second despread adder 64 and shifts its contents one memory location each entry. Preferably the output of the second despread adder 64 is squared to avoid the data from being eliminated, and a feedback loop coupled to a register adder is disposed between the squaring block and the register inputs.

For the example of constituent codes A and B being lengths N=100 and M=100 respectively, the hardware requirement is 200 filter taps, 200 memory locations for tap weights, 198 delay elements, a 200 length shift register, and two despread adders, as opposed to 10,000 filter taps, 10,000 tap weight memory locations, 9,999 unit delay elements, a 10,000-length register, and one despread adder for the prior art correlator 40 of FIG. 3. Each time the code shifts one chip, the embodiment of FIG. 4 requires 200 multiplies and 200 adds, a computational savings of 9,800 for each function as compared to the prior art implementation of FIG. 3. Though unit delay elements are increased in the present invention, the reduction in multiplies typically results in a substantial reduction in computational burden. This is true whether or not the code elements themselves are real, imaginary, or complex.

FIG. 4 and the above hardware description reflects a correlator running at the chip rate. For a similar correlator of the present invention operating at half the chip rate, the input rate at the despreader would double and all delay lines of every stage would double in the number of delay elements. All taps, tap weights, multiplies and additions at each stage except the final stage would be the same as the single chip slips depicted in FIG. 4. For the final stage, each delay element would require a tap and tap weight, and one additional tap and tap weight, with all tap inputs summed at the final despread adder.

It is noted that the prior art correlator 40 employs all unit delay elements, whereas the correlator 52 of FIG. 4 employs 99 unit delay elements and 99 delay elements of 100 time units each. However, these do not incur additional computational overhead or power as compared to unit delay elements. It is this difference in correlator time delay at different levels that makes the composite code of the present invention a multi-rate code. The second constituent code B can be considered to be a cover code running at the rate 1/N, where the first constituent code A has N elements. When the chips in the register are properly aligned with the composite code, an energy profile of the register exhibits a peak that may be used by the receiver to determine the proper composite code AB. The squarer 29 (FIG. 2) enhances that peak.

Hardware can be further reduced in other embodiments of the inventive correlator, those other embodiments being based on how the composite code is constructed. Assume the received signal 57 uses a composite long code ABCD of length 10,000 constructed from four constituent codes, identified as A of length N=10, B of length M=10, C of length L=10, and D of length K=10. Assume also that the chip rate is 50 million chips per second, and the correlator runs at double the chip rate or 100 Mcps so that the 10,000 length composite long code can be resolved within 0.1 milliseconds. This is an adequate time for establishing contact between a hailing node 34 and a command node 24 for the environment of FIG. 1 during acquisition of a discovery channel by which nodes can identify themselves to one another.)

Figure 5:
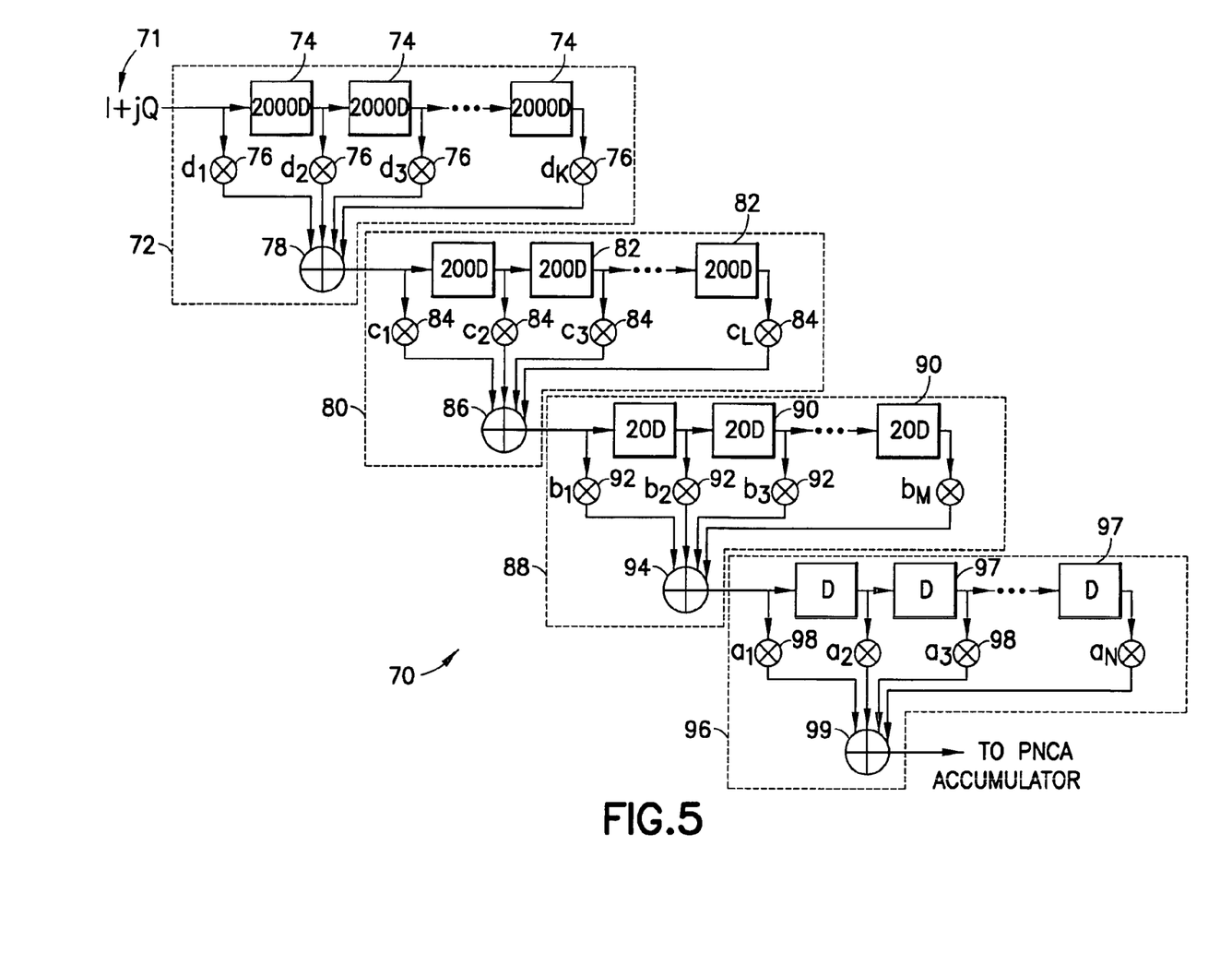
FIG. 5 is similar to FIG. 4 but for operating on a four-level composite code.

An embodiment of a four-stage correlator 70 for the parameters in the above paragraph is presented in block diagram at FIG. 5. An interesting feature of the present correlator is that it is operable to despread the code in any order. That is, where the composite code may have been constructed for example in the order D*C*B*A, the correlator may despread the constituent codes from it in any order, such as A, C, D, B or B, A, D, C. For FIG. 5, the correlator 70 will despread in reverse order as compared to the arbitrary order of construction: A from BCD, B from CD, C from D, followed by D.

The received signal 71 of FIG. 5 is input into a fourth stage 72 to despread constituent code D from CBA. The fourth stage 72 has a serial delay line of fourth stage delays 74 numbering K−1=9, each delaying 2000 unit times or chips. Inputs to the fourth stage filter taps 76 flank each of the delay elements 74 as before and tap the elements $d_1, d_2, d_3, \ldots d_K$. The fourth stage taps 76 are summed at a fourth stage adder 78. Similarly, the third stage 80 has a serial delay line of third stage delays 82 numbering L−1=9, each delaying 200 chips. Inputs to the third stage filter taps 84 flank each of the delay elements 84 and tap the elements $c_1, c_2, c_3, \ldots c_L$. The third stage taps 84 are summed at a third stage adder 86. The second stage 88 has a serial delay line of second stage delays 90 numbering M−1=9, each delaying 20 chips. Inputs to the second stage filter taps 92 flank each of the delay elements 90 and tap the elements $b_1, b_2, b_3, \ldots b_M$. The second stage taps 92 are summed at a second stage adder 94. The first and final stage 96 has a serial delay line of first stage delays 97 numbering N−1=9, each delaying one chip. Inputs to the first stage filter taps 98 flank each of the delay elements 97 and tap the elements $a_1, a_2, a_3, \ldots a_N$. The first stage taps 98 are summed at a first stage adder 99. Except the first stage, the input to the serial line of delay elements is the output from the previous stage's adder.

The embodiment of FIG. 5 requires hardware of 36 delay elements of varying length, 40 filter taps and 40 memory locations for the tap weights, four adders, and (not shown) one 10,000 length register. At each chip interval, the computational burden is 40 multiplies and four adds. This compares favorably to the prior art of FIG. 3. For most implementations of a correlator consistent with these teachings, the small increase in the number of delay elements more than offsets the reduction in multiply and addition functions since a simple delay element requires less combinational logic.

The constituent codes of the correlator of FIG. 5 run at four different rates: the D code can be considered a cover code for ABC running at a rate 1/(N*M*L); the C code may be considered a cover code for AB running at a rate 1/(N*M), and the B code may be considered a cover code for A running at 1/N as with the two-stage embodiment of FIG. 4. As in the example, if the chip rate is 50 Mcps (million chips per second) and the correlator operates at double the chip rate, the A code runs at 100 Mcps, the B code runs at 10 Mcps, the C code runs at 1 Mcps, and the D code runs at 100 kilo chips per second. By varying the relative size of the constituent codes, those rates can be changed without changing the length of the P/N code.

It is noted that the drawings and description presented herein are illustrative of the invention and not exhaustive. For example, while only one correlator is shown in each of FIGS. 2-5, it is understood that the RF/IR section 21 typically divides the received signal into in-phase (I) and quadrature (Q) components, and each component is processed as described herein. The present invention further encompasses a correlator with any non-unity number of stages, arranged relative to one another as described herein. Where complex QPSK modulation is used, it may be advantageous to include cross taps as known in the art in each stage. Such changes and modifications are within the spirit and scope of the invention and are not dedicated to the public.

What is claimed is:

1. A correlator configured to despread a multi-rate composite long code defining a composite length of at least N*M, where N and M are integers each greater than one, comprising:

a first stage comprising:

a first plurality of at least N−1 delay elements arranged in series with one another;

a first plurality of at least N filter taps, each having an input that is coupled to one of an input and an output of a delay element of the first plurality of delay elements; and a first despread adder having an input coupled to an output of each of the first plurality of at least N filter taps;

a second stage comprising:

a second plurality of at least M−1 delay elements arranged in series with one another;

a second plurality of at least M filter taps, each having an input that is coupled to one of an input and an output of a delay element of the second plurality of at least M−1 delay elements;

a second despread adder having an input coupled to an output of each of the second plurality of at least M filter taps and an output coupled to an input of the first plurality of at least N−1 delay elements; and a shift register having an input coupled to an output of the first despread adder, wherein an energy profile of the shift register exhibits a peak when contents of the shift register are in proper alignment with the multi-rate composite long code;

wherein the multi-rate composite long code is constructed from at least a first constituent code and a second constituent code, wherein the first constituent code defines a first length N and the second constituent code defines a second length M, wherein the second constituent code is a cover code running at a rate of 1/N;

wherein the delay elements of the first plurality each delay one unit of time and the delay elements of the second plurality each delay N units of time;

wherein the first stage operates at a rate X and the second stage operates at a rate X/N; wherein N is not equal to M, and X is an integer greater than one.

2. The correlator of claim 1, wherein the multi-rate composite long code defines a length of at least M*N*L and L is an integer greater than one, the correlator further comprising a third stage, the third stage comprising:

a third plurality of at least L−1 delay elements arranged in series with one another;

a third plurality of at least L filter taps, each having an input that is coupled to one of an input and an output of a delay element of the third plurality of at least L−1 delay elements; and a third despread adder having an input coupled to an output of each of the third plurality of at least L filter taps and an output coupled to an input to the second plurality of at least M delay elements.

3. The correlator of claim 1 operating at one half a chip rate, where the second plurality of at least M−1 delay elements comprises at least 2M−1 delay elements and the second plurality of at least M filter taps comprises at least 2M filter taps.

4. The correlator of claim 1 operating at X times a chip rate, where the first plurality of at least N−1 delay elements comprises at least X*N−1 delay elements and the first plurality of filter taps comprises at least X*N filter taps.

5. A method of correlating a received input signal with a multi-rate composite pseudo-random noise (P/N) code that does not repeat for at least N*M elements, where N and M are integers each greater than one and N is not equal to M, the method comprising:

filtering at a first rate each of a set of M first constituent code elements from the received input signal;

summing the filtered set of M first constituent code elements;

filtering at a second rate that is less than the first rate each of a set of N second constituent code elements from the summation of the filtered set of M first constituent code elements;

summing the filtered set of N second constituent code elements;

inputting the summed set of N second constituent code elements into a register;

storing the summed set of N second constituent code elements;

repeating in sequence the filtering at the first rate, summing of the filtered set of M first constituent code elements, filtering at the second rate, summing of the filtered set of N second constituent code elements, inputting and storing for N*M time intervals until N*M separate summed sets of the N second constituent code elements are stored; and determining whether the N*M separate summed sets exhibit an energy peak indicative of proper alignment with the multi-rate composite P/N code, wherein the multi-rate composite P/N code is constructed from at least a first constituent code and a second constituent code, wherein the first constituent code defines a first length N and the second constituent code defines a second length M, wherein the second constituent code is a cover code running at a rate of 1/N.

6. The method of claim 5 wherein the multi-rate composite P/N code does not repeat for at least L*N*M elements and where L is an integer greater than one, the method further comprising:

filtering at a third rate each of a set of L third constituent code elements from the received input signal; and summing the filtered set of L third constituent code elements;

wherein the said filtering at the first rate comprises filtering at the first rate each of the set of M first constituent code elements from the summation of the filtered set of L third constituent code elements; and wherein the said repeating in sequence further comprises filtering at the third rate and summing the filtered set of L third constituent code elements.

7. The method of claim 6 wherein the second rate is X and the third rate is X/(N*M), where X is an integer greater than one.

8. The method of claim 5 wherein the second rate is X and the first rate is X/N, where X is an integer greater than one.

9. A mobile platform for one of transmitting and receiving a discovery burst, comprising:

at least one antenna;

a transmitter configured to transmit via the at least one antenna a discovery burst comprising a preamble and a payload, wherein the preamble is spread using a multi-rate composite pseudo-random noise (P/N) code, the multi-rate composite P/N code having at least N*M serially arranged code segments, each code segment comprising an individual element of N elements of a first constituent code operated using an exclusive OR operator with each of M elements of a second constituent code, wherein the second constituent code is a cover code running at a rate of 1/N;

a receiver configured to receive via the antenna the discovery burst when transmitted by another platform, the receiver comprising a correlator comprising a first stage, a second stage and a shift register, the first stage comprising a first plurality of at least N−1 serially disposed delay elements, a first plurality of at least N filter taps each having an input that is coupled to one of an input and an output of one of the first plurality of at least N−1 delay elements, and a first despread adder having an input coupled to an output of each of the first plurality of at least N filter taps;

the second stage comprising a second plurality of at least M−1 serially disposed delay elements, a second plurality of at least M filter taps each having an input that is coupled to one of an input and an output of one of the second plurality of at least M−1 delay elements, and a second despread adder having an input coupled to an output of each of the second plurality of at least M filter taps and an output coupled to an input of the serial arrangement of the first plurality of at least N−1 delay elements;

the shift register having an input coupled to an output of the first despread adder, wherein an energy profile of the shift register exhibits a peak when contents of the shift register are in proper alignment with the multi-rate composite P/N code;

wherein the first plurality of at least N−1 serially disposed delay elements of the first stage each delay one unit of time and the second plurality of at least M−1 serially disposed delay elements of the second stage each delay N units of time;

wherein the first stage operates at a rate X and the second stage operates at a rate X/N;

wherein N and M are integers each greater than one, N is not equal to M, and X is an integer greater than one.

10. The mobile platform of claim 9 wherein the mobile platform is a powered flight vehicle.

11. The mobile platform of claim 9 wherein the mobile platform is a terrestrial vehicle.

12. The mobile platform of claim 9 wherein the mobile platform is a waterborne vessel.

13. The mobile platform of claim 9 wherein the preamble is less than about 500 symbols and the total discovery burst is about 1200 symbols.

14. The mobile platform of claim 9 wherein the preamble burst further comprises a synchronization pattern disposed between the preamble and the payload.

15. The mobile platform of claim 9 wherein the discovery burst is modulated using BPSK and spread using QPSK.

16. The mobile platform of claim 9 wherein the antenna is an omni-directional antenna.

* * * * *